(12) United States Patent
Mei et al.

(10) Patent No.: US 6,455,158 B1
(45) Date of Patent: Sep. 24, 2002

(54) TREATMENT OF MINERALS WITH ALKYLSILANES AND ALKYLSILANE COPOLYMERS

(75) Inventors: Henry L. Mei, New City, NY (US); Louis M. Panzer, Ridgefield; Herbert E. Petty, Bethel, both of CT (US); Philbert E. Ramdatt, New York, NY (US); Robert E. Christie, North Salem, NY (US); Juan Alfonso, Hopewell Jct., NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/596,113

(22) Filed: Jun. 16, 2000

(51) Int. Cl.$^7$ ................................................ B32B 15/02
(52) U.S. Cl. ..................... 428/403; 428/404; 428/405; 428/407; 523/212; 524/265; 524/267; 524/269
(58) Field of Search ................................ 428/403, 404, 428/405, 407; 523/212; 524/265, 267, 269

(56) References Cited

U.S. PATENT DOCUMENTS 4,061,503 A * 12/1977 Berger

* cited by examiner

Primary Examiner—Leszek Kiliman
(74) Attorney, Agent, or Firm—Michael P. Dilworth

(57) ABSTRACT

The present invention relates to the silanization or surface treatment of minerals with alkylsilanes and alkylsilane copolymers. More specifically, the present invention relates to alkylsilane copolymers useful for surface treating pigments or fillers. The alkylsilane copolymers comprise at least two different monomers. The copolymers find particular utility for the surface treatment of white pigments, such as titanium dioxide, for improving the dispersibility and processibility of the pigments when compounded with a polymeric material, in particular, when compounded with polyolefins.

25 Claims, No Drawings

TREATMENT OF MINERALS WITH ALKYLSILANES AND ALKYLSILANE COPOLYMERS

FIELD OF THE INVENTION

The present invention relates to the treatment of pigments and fillers using alkylsilanes and alkylsilane copolymers. The alkylsilane copolymers are prepared by the hydrolysis and condensation of monomeric or oligomeric silanes. The alkylsilanes and alkylsilane copolymers are particularly useful in the surface treatment of minerals for improving the dispersibility and processibility of the minerals in polymeric compositions. In particular, the alkylsilane copolymers of the present invention find particular utility in the surface treatment of titanium dioxide which is subsequently compounded with polyolefins, especially low density polyethylene. The alkylsilanes find particular utility in the silanization of clays, nanoclays, aluminum trihydroxides and magnesium hydroxides.

BACKGROUND OF THE INVENTION

Organo compounds have been extensively employed in the surface treatment of inorganic particulate materials such as inorganic oxide materials such as films, particulate fillers and pigments, and fibers (such as glass fibers, aluminum fibers and steel fibers) which act to reinforce resins or plastic materials into which it is incorporated.

The typical organosilicon treatment involves coating such surfaces with a hydrolyzate (and/or condensate of the hydrolyzate) of an organofunctional hydrolyzable silane.

In particular, organosilicon compounds have been used to modify pigments such as titanium dioxide in order to alter the dispersion characteristics of the pigment in a given matrix. Matrix materials commonly used include thermoplastic polymers such as low density polyethylene. Such treatment of titanium dioxide is well known in the art. For instance, U.S. Pat. No. 4,061,503 discloses the treatment of particulate titanium dioxide with a polyether substituted silicon compound for improving the dispersibility of titanium dioxide in pigmented and/or filled paints and plastics, and reinforced plastic composite compositions. The silane compound is described and claimed as having at least two hydrolyzable groups bonded to the silicon and an organic group which contains a polyalkylene oxide group, the silane being present on the surfaces of the titanium dioxide particles in an amount sufficient to improve the dispersibility of the particles in a resin or plastic medium.

U.S. Pat. No. 4,151,154 discloses a modified hydrophobic colored or magnetic pigment or filler comprising a hydrophobic pigment or filler containing from 0.05 to 10% by weight, based on the weight of the pigment or filler, or an organopolysiloxane.

Further, U.S. Pat. No. 4,810,305 discloses a modified hydrophobic pigment or filler containing 0.05 to 10 weight % of an organopolysiloxane with improved dispersibility in synthetic resins, and U.S. Pat. No. 5,607,994 and U.S. Pat. No. 5,631,310 disclose the use of alkylsilane for the treatment of $TiO_2$ to improve processibility in compounding with plastics and improve performance properties such as lacing resistance in a polymer matrix.

U.S. Pat. No. 4,950,779 describes a nonaqueous method of making silicone oligomers by using stoichiometric amounts of formic acid to effect the condensation of polyalkyoxysilanes or polyaminosilanes.

U.S. Pat. No. 5,932,757describes a mixture of oligomers of condensed alkylalkoxysilanes suitable for application in particular, to mineral surfaces, which substantially prevents wetting of the mineral surfaces by a hydrophilic liquid.

The present inventors have found that the hydrolysis and condensation of different silanes, as opposed to the self condensation of a single silane or silane oligomer, i.e. monomers, can produce alkylsilane copolymers and terpolymers which have a broader range of performance capabilities than a homopolymer. The alkylsilane copolymers and terpolymers of the present invention may be utilized for the surface treatment of fillers, pigments and so forth to improve the dispersibility of such compounds in a thermoplastic resins or polymers, including olefinic polymers such as low density polyethylene, even at extremely high loading levels. The treated filler or pigments of the present invention exhibit excellent compounding processibility, dispersion, and optical properties including whiteness and yellowness index, when blended with olefinic polymers in contrast to untreated fillers and pigments, or fillers and pigments treated with single silanes or silane oligomers or homopolymers. In particular, the present invention has found utility in the treatment of titanium dioxide pigment for improved dispersibility in low density polyethylene.

SUMMARY OF THE INVENTION

The present invention relates to the surface treatment of pigments and fillers with alkylsilanes and alkylsilane copolymers.

The alkylsilane copolymers of the present invention are prepared by hydrolysis and condensation of monomeric and/or oligomeric silanes. The alkylsilane copolymers have a plurality of hydrolyzable groups and comprise, in their backbone structures, at least two different monomers.

More specifically, the alkylsilane copolymer of the present invention has the following general structure:

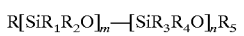

where

R, $R_1$, $R_4$ and $R_5$ are hydrolyzable groups such as alkoxy, halogen, acetoxy, hydroxy, and so forth, or mixture thereof;

$R_2$ is a nonhydrolyzable $C_1$–$C_{20}$, aliphatic, cycloaliphatic or aromatic hydrocarbon group directly or indirectly bonded to the silicon atom;

$R_3$ is selected from nonhydrolyzable and hydrolyzable groups different from $R_2$;

and m and n are each independently 1 to 20.

The alkylsilanes may also be terpolymers of the following general formula:

where R, $R_1$, $R_2$, $R_3$, $R_4$ and $R_5$ are as described above;

$R_6$ may be a nonhydrolyzable group as defined for $R_3$ but different from $R_2$ and $R_3$;

$R_7$ is a hydrolyzable group such as alkoxy, halogen, acetoxy, hydroxy, and so forth, or mixture thereof; and m, n and p are each independently 1 to 20.

The alkylsilanes are alkyltrialkoxysilanes.

The alkylsilane copolymers and alkylsilanes of the present invention can be used to surface treat or silanize mineral type compounds such as pigments or fillers. In particular, the alkylsilanes are useful for the silanization of clays, nanoclays, aluminum trihydroxides and magnesium hydroxides.

This surface treatment or silanization improves the dispersibility and processibility of the pigments or minerals when compounded with polymeric materials. The materials require lower torque and pressure when melt compounded with polymeric materials in extruders.

The surface treated or silanized pigments or fillers of the present invention, in addition to the improvements noted above, also exhibit excellent optical properties including whiteness and yellowness index, hue, chroma and gloss.

DETAILED DESCRIPTIONS OF THE PREFERRED EMBODIMENTS

The compounds that can be treated or silanized using the alkylsilanes and alkylsilane copolymers and terpolymers of the present invention include pigments and fillers, inorganic particulate materials such as inorganic oxide materials such as films, and fibers (such as glass fibers, aluminum fibers and steel fibers) which act to reinforce resins or plastic materials into which it is incorporated. In particular, alkylsilanes and alkysilane copolymers and terpolymers can be used to treat white pigments and fillers.

Some specific materials for surface treatment or silanization include calcined clay, nanoclay, aluminum trihydroxide, magnesium hydroxide, and so forth. In particular, the alkylsilane copolymers of the present invention can be used to treat titanium dioxide which is often used as a pigment.

The $TiO_2$ pigments useful in the present invention generally are in the rutile or anatase crystalline form. They are commonly prepared by either a chloride process or a sulfate process. The optimum average particle size can range from about 0.005 to about 1 micron. The $TiO_2$ pigments may also contain ingredients added thereto to further improve dispersibility characteristics or other properties such as durability. For instance, the pigment may contain additives and/or inorganic oxides, such as aluminum, silicon or tin as well as triethanolamine, trimethylopropane, phosphates, etc.

"Treated" pigments or fillers are defined herein to refer those pigments or fillers surface treated with at least one alkylsilane copolymer, or a mixture of at least one alkylsilane copolymer and at least one triorganosilyl terminated nonhydrolyzable polydiorganosiloxane (collectively referred to herein as organosilicon compounds).

"Silanized" pigments or fillers are defined herein to refer to those pigments or fillers surface treated with at least one single alkylsilane or alkylsilane monomer.

According to the present invention, silane monomers of different chemical structures can be hydrolyzed or condensed to form copolymers, terpolymers, and so forth. The alkylsilanes of the present invention must be formed with at least two different monomers, but no limit is placed on how many different monomers may be utilized. Hereinafter, the present specification will refer to the structures generally as copolymers, although reference is also made to terpolymers, without intent to limit the number of different monomers utilized, to three. For instance, four monomers or more, could be conceivably used to form the polymers of the present invention.

The use of different monomers in the alkylsilane copolymer backbone can result in a polymer having different functional groups in the comonomers. The dual functionality of the copolymer can provide stronger coupling to the fillers and better compatibility to the base resin. For instance, if one monomer is unsaturated such as a vinyl, a crosslinking function can be provided in addition to the coupling and compatibility functions. Terpolymers can be designed using precondensation to provide three different functions including coupling, crosslinking and compatibility with the polymer resin depending on the type of silane or silicon compound chosen, and the pendant functional groups that silane or silicon compounds have.

The alkylsilane copolymers are commercially available, or can be prepared by processes known in the art such as those described in "Organosilicon Compounds", S. Pawlenko, et al., New York (1980), the teachings of which are incorporated herein by reference. Copolymers may be prepared from silanes having at least 2 hydrolyzable groups through hydrolysis and condensation reactions. Silanes with a single hydrolyzable group may be utilized to endcap the copolymers. Hydrolysis of silanes is described in greater detail in "Organofunctional Silanes" by Union Carbide (1991), the teachings of which are incorporated herein by reference.

The condensation reaction can be accelerated by using formic acid and a catalyst. The condensation reaction leads to a large portion of the alkoxy groups being pre-condensed prior to treatment of the pigments or fillers, e.g. $TiO_2$, which subsequently leads to a faster reaction rate during the treatment. Furthermore, the precondensed copolymers produce less VOC's during the treatment of minerals.

The alkylsilane copolymers and terpolymers of the present invention may be formed using a variety of combinations including, for instance, an alkylsilane with 2 or 3 hydrolyzable groups such as alkoxy, acetoxy, hydroxy, or halide (in particular chloride), co-condensed with at least one second silane having at least 2 hydrolyzable groups such as methacryloxypropylsilane or vinyltrialkoxysilane, any silicon compound having at least 2 hydrolyzable groups such as tetraethylsilicate or tetramethylsilicate, or a linear or cyclic organosilicon compound such as tetracyclodimethylsiloxane (D4).

More specifically, examples of suitable silane monomers useful in forming the copolymers and terpolymers of the present invention include, but are not limited to, alkyltrialkoxysilanes such as Silquest® A-162 methyltriethoxysilane supplied by Crompton Corp. in Middlebury, Conn.; Silquest® A-1630 methyltrimethoxysilane; Silquest® A-137 octyltriethoxysilane; and Silquest® Y-11869 octadecyltriethoxysilane all supplied by Crompton, Corp. In one embodiment of the present invention, Silquest® A-137 octyltriethoxysilane is utilized.

Other alkylsilane monomers useful herein include, but are not limited to, butyltriethoxysilane, dodecyltriethoxysilane, octyltrimethoxysilane, octadecyltrimethoxysilane, butyltrimethoxysilane, dodecyltrimethoxysilane, and mixtures thereof.

The alkylsilane copolymers of the present thus have a plurality of hydrolyzable groups, and at least two different monomers in their backbone structure. By a "plurality" it is meant 2 or more, preferably 3 or more, and more preferably 4 or more hydrolyzable groups.

The silane copolymers of the present invention may be characterized by the following general formula:

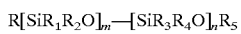

where
R and $R_1$ are hydrolyzable groups such as alkoxy, halogen, acetoxy, hydroxy, and so forth, or mixture thereof;
$R_2$ is a nonhydrolyzable $C_1$–$C_{20}$, aliphatic, cycloaliphatic or aromatic alkyl group directly or indirectly bonded to the silicon atom;

$R_3$ is selected from nonhydrolyzable and hydrolyzable groups different from $R_2$, for instance $R_3$ may be a nonhydrolyzable group such as alkyl, which may be optionally substituted with epoxy, amino, mercapto, ureido ($H_2NC(=O)NH-$), or interrupted with one or more sulfur or oxygen atoms, alkenyl, (e.g. vinyl, allyl, methallyl, hexenyl, etc), (alk)acryloxyalkyl (e.g. acryloxypropyl or methacryloxypropyl), and aryl, or $R_3$ may be a hydrolyzable group such as alkoxy, halogen, acyloxy (e.g. acetoxy, (alk)acryloxy, etc.), hydroxy mercapto, amino or mixtures thereof;

$R_4$ and $R_5$ are hydrolyzable groups including alkoxy, halogen, acetoxy, hydroxy, and so forth, or mixture thereof;

and m and n are each independently 1 to 20.

In some particular embodiments of the present invention, the silane copolymer utilized is octyltriethoxysilane/tetraethoxysilicate.

The silane terpolymers of the present invention have the following general structure:

$$R[SiR_1R_2O]_m-[SiR_3R_4O]_n-[SiR_6R_7O]_pR_5$$

where

R and $R_1$ are hydrolyzable groups such as alkoxy, halogen, acetoxy, hydroxy, and so forth, or mixture thereof;

$R_2$ is a nonhydrolyzable $C_1-C_{20}$, aliphatic, cycloaliphatic or aromatic alkyl group directly or indirectly bonded to the silicon atom;

$R_3$ is selected from nonhydrolyzable and hydrolyzable groups different from $R_2$;

$R_4$ and $R_5$ are hydrolyzable groups such as alkoxy, halogen, acetoxy, hydroxy or mixtures thereof;

$R_6$ may be a nonhydrolyzable group such as alkyl, vinyl, methacryloxy, or any unsaturated double bond rather than vinyl, or may be a hydrolyzable group such as alkoxy, halogen, acetoxy, hydroxy, and so forth, or mixture thereof;

$R_7$ is a hydrolyzable group such as alkoxy, halogen, acetoxy, hydroxy, and so forth, or mixture thereof; and m, n and p are each independently 1 to 20.

The copolymers thus formed can then be used to treat fillers or pigments, specifically titanium dioxide ($TiO_2$), to improve the dispersibility, compounding processibility, and in the case of pigments, to improve the whiteness, when compounded with polymeric resins, and in particular when compounded with olefinic polymers. Using the precondensed silane copolymers of the present invention provides an advantage over single alkylalkoxysilanes in that lower VOC's, particularly lower alcohol emission including methanol and ethanol emission, are produced during treatment of the pigment or filler in contrast to using a single silane, i.e. oligomeric or monomeric, alkylalkoxysilanes, for instance. The precondensation of the alkoxy groups during the copolymerization results in less alcohol formation during the treatment of minerals with the silane copolymers, the latter also occurring through hydrolysis and condensation.

The copolymers are useful from about 0.1 wt-% to about 5 wt-% based on the weight of the treated pigment or filler, and preferably from about 0.5 wt-% to about 3 wt-%.

Optionally, the copolymers of the present invention may be used in combination with a polysiloxane. Suitable polysiloxanes have the following general formula:

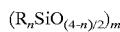

$$(R_nSiO_{(4-n)/2})_m$$

wherein

R is an organic or inorganic group;

n is 0 to 3; and m is equal or greater than 2.

In addition to the treatment of minerals with copolymers and terpolymers, the present inventors have found that single alkylsilanes may be utilized to treat certain minerals including nanoclays, clays, aluminum trihydroxides, and magnesium hydroxides. The alkylsilanes useful for such treatment include the alkyltrialkoxysilanes noted above. In particular, the alkyltrimethoxysilanes and alkytriethoxysilanes including but not limited to methyltrimethoxysilanes, octyltrimethoxysilanes, butyltrimethoxysilanes, dodecyltrimethoxysilanes, octadecyltrimethoxysilanes, methyltriethoxysilanes, octyltriethoxysilanes, butyltriethoxysilanes, dodecyltriethoxysilanes, octadecyltriethoxysilanes, and so forth.

The alkylsilanes and alkylsilane copolymers may be used in combination with nonhydrolyzable polysiloxanes. Examples of useful polysiloxanes include the group of triorganosilyl terminated polydiorganosiloxanes including Silwet® L-45 polydimethylsiloxane (PDMS) available from Crompton Corp. in Middlebury, Conn., vinyl phenylmethyl terminated dimethyl siloxanes, divinylmethyl terminated PDMS and like, PDMS with polyether pendant groups (Silwet® PA-1), and so forth. In some particular embodiments of the present invention, PDMS sold under the trade name of Silwet® L-45 PDMS, is utilized.

The polysiloxanes are also commercially available, or can be prepared by processes known in the art such as those described in "Organosilicon Compounds", S. Pawlenko, et al., New York (1980), the teachings of which are incorporated herein by reference.

The combination of copolymer and/or nonhydrolyzable siloxane is useful from about 0.1 to about 5.0% by weight, preferably from about 0.5 to about 4.0% by weight, and most preferably from about 0.5 to about 3.0% by weight based on the treated pigment or filler. A preferred blend includes from about 0.5 to 2.0% by weight of the silane copolymer and from about 0.5 to about 2.0% by weight of the polysiloxane. The ratio of silane copolymer to nonhydrolyzable polysiloxane may be from about 1:2 to about 2:1, and is preferably about 1:1.

The method of addition is not especially critical and the pigment or filler may be treated with the alkylsilane copolymer in a number of ways. For example, the silane addition can be made neat or prehydrolyzed to a dry pigmentary base, from a slurry, a filtration step, during drying or at a size operation such as fluid energy mill, e.g., micronizer, or media mill as described in greater detail in U.S. Pat. No. 5,501,732, the teaching of which are incorporated herein by reference, or post blending after micronizing.

U.S. Pat. No. 3,834,924 describes organosilane and pigment dispersions mixed or blended directly in a suitable solids mixing apparatus. An example of post blending is described in greater detail in U.S. Pat. No. 3,915,735 and U.S. Pat. No. 4,141,751. The nonhydrolyzable polydiorganosiloxane addition can be made in conjunction with the silane or post added to the treated pigment. The silane addition and polysiloxane addition are described in greater detail below. If water, either liquid or vapor (steam), is present as a component of the process stream, hydrolysis of the hydrolyzable groups of the silane will occur and the silane coating will bond to the pigment, for instance $TiO_2$, base. Prehydrolyzing the alkylsilane copolymer is a preferred step in treating the pigment with the silane copolymer.

The alkylsilane or alkylsilane copolymer, optionally in combination with a nonhydrolyzable polysiloxane, may be coated on the surface of the pigment or filler in an amount of about 0.1% to about 5.0% by weight of the treated titanium dioxide, and preferably from about 0.5% to about 3.0% by weight according to the present invention.

The treated pigments or fillers of the present invention may be used in combination with any polymeric material with which such compounds are typically used. The alkylsilane copolymer acts, in a sense, as a dispersion promoter, by increasing the compatibility and dispersibility of the inorganic oxide or other particulate material within the plastic or resin system in which it is supplied.

The polymers useful herein are known to those of skill in the art. Typically, the general classes of polymers suitable for use herein are thermoplastic, or are thermosetting polymeric resinous materials, and include but are not limited to, polymers of ethylenically unsaturated monomers including olefins such as polyethylene, polypropylene, polybutylene, and copolymers of ethylene with higher olefins such as alpha olefins containing 4 to 10 carbon atoms or vinyl acetate, etc.; vinyls such as polyvinyl chloride; polyvinyl esters such as polyvinyl acetate; polystyrene; acrylic homopolymers and copolymers; phenolics; alkyds; amino resins; epoxy resins; polyamides; polyurethanes; phenoxy resins; polysulfones; polycarbonates; polyesters and chlorinated polyesters; polyethers; acetal resins; polyimides; and polyoxyethylenes. The polymers according to the present invention also include various rubbers and/or elastomers either natural or synthetic polymers based on copolymerization, grafting, or physical blending of various diene monomers with the above mentioned polymers, all as generally known in the art. Thus generally, the present invention is useful for any such white-pigmented plastic or elastomeric compositions (collectively referred to herein as white-pigmented polymers). For example, but not by way of limitation, the invention is felt to be particularly useful for polyolefins such as polyethylene and polypropylene, polyvinyl chloride, polyamides and polyesters.

Polymeric materials useful to the present invention are discussed in U.S. Pat. No. 4,061,503 and U.S. Pat. No. 4,151,154, both incorporated by reference herein in their entirety.

In some particular embodiments of the present invention, the polymers chosen for use include polyolefins such as polyethylene and polypropylene, polyvinyl chloride, polyamides, polyesters and copolymers and terpolymers thereof.

The term "high loaded" $TiO_2$ may vary widely, depending on the type of polymer used and may be anywhere from about 40 wt-% $TiO_2$, to greater than 85 wt-% $TiO_2$. For instance, in a polyolefin matrix, a high loaded $TiO_2$ would be 50 wt-% or more of the $TiO_2$ pigment, based on the total weight of polyolefin matrix. Such a determination is within the knowledge of those of skill in the art.

A wide variety of conventional additives may be optionally added to the polymeric compositions of the present invention as is necessary, desirable or conventional for the intended end use. Such additives include but are not limited to antioxidants, ultraviolet (UV) stabilizers, lubricants, thermal processing additives, and so forth. Such additives are known to those of skill in the art.

Pigment or filler coated with organosilicon compounds can be incorporated into a melt-fabricable polymer to form the polymeric compositions of the present invention by any melt compounding technique known to those of skill in the art. Generally, pigment and polymeric resin are added together, and are subsequently mixed in a blending apparatus that applies shear to the polymer melt. The polymeric resin is typically commercially available in a variety of forms including but not limited to powder, granules, pellets, cubes, and so forth.

In a typical mixing operation, pigment and polymer are first combined and are dry blended while the polymer is still in a solid, premelted state. This can be accomplished with simple processes such as by shaking in a bag or by tumbling in a closed container. More sophisticated methods include blending apparatuses having agitators or paddles. The pigment and the polymeric resin can be co-fed into mixers having an internal screw, i.e. an extruder device, which mixes the pigment and polymer prior to the polymer achieving a molten state.

Melt blending the components may be accomplished using any conventional equipment known to those of skill in the art including single-screw extruders, twin-screw extruders including the broad range of counter-rotating twin screw extruders and co-rotating twin screw extruders, kneaders, high shear mixers, blender type mixers, and so forth. Twin-screw extruders are commonly used. The melt blending can be accomplished during formation of an article such as during a melt extrusion process. Melt extrusion can also be combined with blow molding, for instance.

Exemplary mixers include twin screw extruders and Banbury mixers. Co-rotating twin screw extruders are manufactured by Werner and Pfleiderer in Ramsey, N.J. Counter-rotating twin screw extruders are manufactured by Leistritz Extruder Corp. in Somerville, N.J. Farrel Corp. in Ansonia, Conn. manufactures Banbury mixers.

There are numerous ways of preparing the polymeric compositions of the present invention. A concentrate may first be prepared having a high concentration of pigment or filler, and then subsequently combine the concentrate with polymeric resin. The highly loaded polymer concentrates are made as described above with the desirable weight-% of pigment for the intended end use. For example, in polyolefin concentrates, about 50–85% by weight concentrate may be used to opacity the composition. The pigment concentrate is "let down" into the polymer. As used herein, "let down" refers to a ratio or percentage of polymer mixed with concentrate. Let down may be accomplished in a number of ways and is described in great detail in "Film Extrusion Manual" (1992), the teachings of which are incorporated herein by reference. For example, in optical property evaluation, a 50 wt-% to 87 wt-% concentrate may be let down to about 0.2 to 30 wt-% by dry mixing polyolefin, extruding at a specific temperature, and casting it into a film. The pigment performance is then evaluated in an end use application.

The highly loaded treated pigment or filler exhibits outstanding processibility in polyolefinic matrices, and excellent lacing resistance. The torque and pressure can be utilized to determine the relative ease with which the compositions are processed through a mixer, e.g. an extruder, for instance. The lower the torque and pressure required to mix and move the composition through the equipment, the easier the processing is. Furthermore, typically, the higher the loading of pigment or filler, for example $TiO_2$, in a polymer concentrate, the slower the processing rates.

The compositions of the present invention require lower torque and pressure for processing, particularly through an extruder, than do those polymeric compositions compounded with untreated pigment or filler, and faster processing rates can also be obtained.

Lacing refers to the development of imperfections in a polyolefin matrix. Lacing occurs as a result of volatiles released from the pigment during high temperature polyolefin fabrication processes. Lacing may also be attributable to, for instance, $TiO_2$ concentrates picking up moisture. More specifically, lacing occurs as a function of pigment volatility at specific wt-% of pigment loadings and at specific processing temperatures. For polyethylene films pigmented with titanium dioxide, 20% wt-% $TiO_2$ in the film processed at temperature of 620° F. or greater will readily exhibit lacibility of the film. Typically, materials are rated on a scale of 1 to 10. The materials will be rated a 10 if they do not exhibit any lacing, and below 10 if they begin to lace. Lacing resistance is known to one of skill in the art and is also discussed in U.S. Pat. No. 5,607,994 and U.S. Pat. No. 5,631,310, both incorporated by reference herein in their entirety.

Other advantages include increased bulk density, lower viscosity, excellent dispersion, excellent moisture resistance, and excellent optical properties such as high whiteness and gloss.

The polymeric materials containing the treated particles of the present invention are useful in a variety of applications including various articles. The polymeric compositions of the present invention may be employed, for example, for molding (including extrusion, injection, calendering, casting, compression, lamination, and/or transfer molding), coating (including lacquers, film bonding coatings and painting), inks, dyes, tints, impregnations, adhesives, caulks, sealants, rubber goods, and cellular products. Thus the choice and use of the polymeric compositions with the treated particles of this invention is essentially limitless.

One of ordinary skill in the art would understand that there are a vast number of modifications which could be made without changing the scope of the invention, those modifications and embodiments thereof are contemplated to be within the scope of the present invention.

Optionally, other additives may be used in the compositions of the present invention including, but not limited to antioxidants, ultraviolet (UV) stabilizers, lubricants, thermal processing additives, and so forth. Such additives, as well as others not mentioned here, are known to those of skill in the art.

Pigments or fillers coated with organosilicon compounds can be incorporated into a melt-fabricable polymer to form the polymer composition of this invention by any melt compounding technique known in the art. Generally, pigment and/or filler, and polymer resin are brought together and then mixed in a blending operation that applies shear to the polymer melt. The polymer resin is usually available in the form of powder, granules, pellets, or cubes. Usually, pigment and/or filler and resin are first combined while the resin is in the solid state (not melted) and dry-blended in some way. This can be done in simple ways, such as by shaking in a bag or tumbling in a closed container, or in more sophisticated ways such as by using blends having agitators or paddles. Pigment and/or filler and polymer resin can be brought together by co-feeding the materials to internal mixers and allow a screw to mix them together before the resin reaches the molten state. The melt blending of pigment and/or filler and polymer resin can be done using known equipment, such as single-screw extruders, twin-screw extruders, internal mixers and the like. Twin-screw extruders are commonly used. The melt blending can be done as part of the process of forming a finished article of the composition, as by melt extrusion.

There are many ways for preparing polymer compositions of this invention. One may, for example, first prepare a concentrate having high pigment and/or filler concentration, and then combine or further compound the concentrate with polymer resin containing no pigment or filler.

The treated pigments or fillers may be incorporated into a polymeric resin system with or without the addition of a silicon fluid such as a polydimethylsiloxane.

The treated pigments or fillers of the present invention are useful when compounded with polymeric materials in the range of about 0.01% to about 90% by weight of the polymer/treated pigment or filler composition. The treated pigments or fillers of the present invention can be utilized with polymers, in particular low density polyethylene, at very high loading levels of as much as 90 wt-% pigment or filler based on the weight of the composition. Highly loaded polymer concentrates can be made as described above with the desirable weight-% for the intended end use. For example, in polyolefin concentrates, about 40–85% by weight concentrate may be used to opacify. The concentrate is "let down" into the polyolefin. Used herein, "let down" refers to a ratio or percent of resin mixed with concentrate. Let down may be accomplished in a number of ways and is described in great detail in "Film Extrusion Manual" (1992), the teachings of which are incorporated herein by reference. For example, in optical property evaluation, a 50 wt-% to 87 wt-% concentrate may be let down to about 0.2 to about 30 wt-% by dry mixing polyolefin, extruding at a specific temperature and casting it into a film. Pigment performance, for instance, is then evaluated in an end use application.

The treated or silanized pigments and/or fillers of the present invention exhibit outstanding processibility, faster output, and better dispersion when incorporated into a polymeric system, i.e. a polyolefin matrix, even at very high loadings, versus using an untreated pigments. Additional advantages observed over systems using an untreated pigment include increased bulk density, lower viscosity, high moisture resistance, and excellent optical properties such as a higher whiteness and gloss and a lower yellowness index. The mechanical properties exhibited by the polymeric system was also improved.

The following non-limiting examples are illustrative in nature, and are not intended to limit the scope of the present invention in any way.

EXAMPLES

TEST METHODS

1. Viscosity (Pascal/Second)

The viscosity of the treated or silanized pigment or filler loaded polymer was measured at 190° C. using a Tinius Olsen Extrusion Plastometer available from Tinius Olsen Corp. in Willow Grove, Pa.

2. Melt Flow Index (grams/10 minutes at 190 degrees Celsius)

The melt index was measured at 190° C. using a Tinius Olsen Extrusion Plastometer available from Tinius Olsen Corp. in Willow Grove, Pa.

3. Yellow Index and Whiteness

The yellowness index and whiteness were measured using the films and plaques as prepared above using a Colorgard System 1000 colorimeter manufactured by Pacific Scientific in Silver Spring, Md. Film thickness was approximately 4 mils.

4. Gloss

The gloss of the film and plaque samples was measured with a GL-4525 glossmeter manufactured by Paul N. Guard Co. in Pompano Beach, Fla. Film thickness was approximately 4 mil.

5. Hue and Chroma

The hue and chroma of the film and plaque samples were measured using a Minolta CR 231 chromameter available from Minolta in Osaka, Japan. The films tested had a thickness of ~4 mil.

6. Dispersion

The dispersion of the pigment was tested using a light box. Film thickness was approximately 1 mil. The distribution and uniformity of $TiO_2$ in the LDPE thin film samples were looked at by a light box. The dispersion of $TiO_2$ in the polymer was rated as excellent, good, fair and poor.

Example 1

Preparation of a Copolymer

To a mixture of 553 g (2 moles) of Silquest® A-137 octyltriethoxysilane available from Crompton Corp. and 416.7 g (2 moles) of tetraethyl silicate in a 2 liter three-necked flask equipped with a heating mantle, magnetic stirrer and distillation apparatus, was added with stirring 5.1 g of Purolite® CT-175 acidic ion exchange resin and 161.1 g. of formic acid (96%). The reaction mixture was heated to 70–75° C. over a period of about 6 hours removing 311.7 g of a mixture of ethanol and ethyl formate by distillation. The contents of the flask were cooled and filtered to remove the ion exchange resin. The product was then vacuum distilled at 150° C. and 1 mm Hg, collecting 49 g of unreacted Silquest® A-137 and yielding 603.5 g of a clear, colorless copolymer product with viscosity of 100 centistokes. The copolymer was identified as octyltriethoxysilane/TES copolymer using NMR (nuclear magnetic resonance) and GPC (gel permeation chromatography), both methods known to those of ordinary skill in the art.

The following examples were prepared using a masterbatch concentrate (an 80 wt-% loaded $TiO_2$ in LDPE) prepared as following. Titanium dioxide powder was treated with alkylsilane copolymer, or optionally treated with an alkylsilane copolymer/polysiloxane blend. The treated $TiO_2$ was mixed with Microthene® GMN 711-20 LDPE (melt flow index (MFI) 22 g/10 minutes) available from Equistar in Houston, Tex. in a Henschel dry mixer manufactured by Prodex Corp. in Fords, N.J. The dry mix was fed into a twin screw extruder (ZSK 30 by Werner & Pfleiderer at Ramsey, N.J., U.S.A.) for melt extrusion compounding. The temperature, pressure, rotating speed, torque and power consumption were recorded. The extruded rods were fed into a water bath, and were subsequently air knifed and pelletized. The pellets were fed through a Brabender model PL-V302 extruder with a 6" wide slot die. The resultant blend was a high loaded 80 wt-% $TiO_2$ in LDPE. The dispersion of the final films was tested using a light box.

The resultant masterbatch was let down to 8%. The remaining ingredients including Petrothene® NA206 (MFI 13) LDPE available from Equistar, Irganox® B-215 and Irganox® 1010 antioxidant available from Ciba Specialty Chemicals in Tarrytown, N.Y. and Tinuvin® 783FP UV stabilizer also available from Ciba Specialty Chemicals were added into the masterbatch pellets with bag dry mixing. The dry mix was fed into a 2" single screw extruder manufactured by Midland Ross Hartic for melt compounding. The extruded strands were fed through a water bath and pelletizer. The resultant pellets were made into film samples using a Brabender model PL-V302 single screw extruder with a 6" wide slot die. The dispersion of the films was tested using a light box. The film samples were also tested for optical performance including whiteness, yellowness index, gloss, hue and chroma.

Example 2

RCL-9, pigmentary rutile $TiO_2$ available from Millenium Inorganic Chemicals in Baltimore, Md. (2500g) was added to a Patterson-Kelly Twin shell V-Blender and sprayed with a solution of 25 grams octyltriethoxysilane/tetraethyl silicate copolymer. The silane copolymer was in a 20% solution of a 90/10 methanol/water mixture. The treated $TiO_2$ (2400 g) was dried in an oven at 60° C. for 8 hours and then compounded with 600 g of Microthene® GMN 711-20 (MFI 22) LDPE from Equistar in a Werner & Pfleiderer (Ramsey, N.J.) twin screw extruder model ZSK 30. The weight ratio of treated $TiO_2$ to LDPE was 80:20. Pellets were made and used to prepare film samples as described above.

Example 3

RCL-9 pigmentary rutile $TiO_2$ was treated with 1% each of octyltriethoxysilane/tetraethoxysilicate copolymer and PDMS L-45 polydimethylsiloxane available from Crompton Corp. in Greenwich, Conn. The PDMS was mixed with the alkylsilane treated $TiO_2$ and LDPE in a Henschel mixer for about 1 minute at 2200 rpms. The ratio of PDMS/$TiO_2$/LDPE was 24/2400/600 grams. The dry mix was then compounded through a twin screw extruder as described in Example 1.

Example 4

The same procedure was followed as in Example 3 except that the $TiO_2$ was treated with 2 wt-% vinyltriethoxysilane/octyltriethoxysilane copolymer and 1 wt-% PDMS.

Example 5

The same procedure was followed as in Example 3 except that the $TiO_2$ was treated with 2 wt-% octyltriethoxysilane/$D_4$ tetracyclodimethylsiloxane (available from Crompton Corp.) copolymer and 1% PDMS.

Comparative Example A

Untreated $TiO_2$ available under the trade name of RCL-9 from Millennium Inorganic Chemicals was dry mixed with Microthene® GMN 711-20 (MFI 22) LDPE from Equistar in a plastic bag and fed through the twin screw extruder for melt extrusion compounding as described in the examples above.

The results of the tests for examples 2–5 and comparative example A are summarized in the table below.

TABLE 1

| Example | Extrusion Observation | Torque ft-lb | Pressure (psi) | Dispersion (film samples) |
|---|---|---|---|---|
| 2 | Ok, low feed rate | 1710 | <25 | good |
| 3 | smooth and runs well | 1840 | 25 | excellent |
| 4 | runs OK | 1720 | 25 | good |
| 5 | runs OK | 1640 | <25 | fair |
| A | brittle, rough surface, very difficult to run | 2600 | 400 | a film could not be made |

This data demonstrated the processing advantages of using the silane copolymers of the present invention as well as using a combination of the silane copolymer and polysiloxane to treat $TiO_2$ pigments (Examples 2–5) as compared to an untreated $TiO_2$ pigment (Comparative Example A) using an 80 wt. % $TiO_2$/polyethylene masterbatch. Shown in the table are extrusion observation, torque, pressure and dispersion as determined using film samples.

Due to the incompatibility between untreated $TiO_2$ and LDPE, it was very difficult to make an 80 wt % masterbatch with LDPE filled with the untreated $TiO_2$. Films could not be made. Consequently, the compounding experiments were conducted at the 30 wt-% level and were compared to the silane copolymer and silane copolymer/siloxane treated $TiO_2$ using the same loading level.

Comparative Example B

Untreated RCL-9 $TiO_2$ available from Millennium Inorganic Chemicals was dry mixed with Petrothene® NA-206 (MFI 13) from Equistar at a weight ratio of 30:70 in a plastic bag and then fed into a twin screw extruder for melt extrusion compounding and pelletized as described above. The pellets were dried and film samples were prepared also as described above.

Example 6

The same procedure was followed as in the examples above to surface treat $TiO_2$ with 1% of octyltriethoxysilane/ tetraethyl silicate copolymer. The weight ratio of treated $TiO_2$ to LDPE was 30:70.

Example 7

The same procedure was followed as in the examples above to surface treat $TiO_2$ with 1% of octyltriethoxy silane/tetraethyl silicate copolymer and 1% of PA-1 organomodified polydimethylsiloxane from Crompton Corp. in Greenwich, Conn. The weight ratio of treated $TiO_2$ to LDPE was 30:70.

Example 8

The same procedure was followed as in the examples above to surface treat $TiO_2$ with 2% vinyltriethoxysilane/ octyltriethoxysilane copolymer and 1% PA-1 organomodified PDMS from Crompton Corp. The weight ratio of treated $TiO_2$ to LDPE was 30:70.

Example 9

The same procedure was followed as in the examples above to surface treat $TiO_2$ with 2% octyltriethoxysilane/$D_4$ tetracyclodimethylsiloxane (available from Crompton Corp.) copolymer and 1% PA-1 PDMS from Crompton Corp. The weight ratio of treated $TiO_2$ to LDPE was 30:70.

The viscosity and melt flow rate of the pellets were measured using an extrusion plastometer manufactured by Tinius Olsen in Willow Grove, Pa. The whiteness and yellowness index of the film samples were measured using a Colorgard® colorimeter System 05 manufactured by Pacific Scientific, USA.

The results of the testing for examples 6–9 and for comparative example B are summarized in table 2 below.

TABLE 2

| Example | Viscosity (Pa/sec) | flow rate grams/10 min | Whiteness D 1925 | Yellowness D 1925 |
|---|---|---|---|---|
| Comparative B | 901.5 | 10.97 | 71 | 7.32 |
| 6 | 841.5 | 12.6 | 90 | 2.41 |
| 7 | 718.3 | 14.5 | 81 | 4.3 |
| 8 | NA | NA | 85 | 3.01 |
| 9 | NA | NA | 84 | 3.85 |

The data found in table 2 demonstrates the improved processing characteristics and optical properties obtained using the alkylsilane copolymers of the present invention to surface treat $TiO_2$ and then compounding with LDPE (examples 6–9) as compared to using an untreated $TiO_2$ pigment with LDPE (comparative example B).

Example 10

Satintonet® calcined clay available from Englehart (3000 g) was added to a Patterson Kelly Twin Shell V-Blender and sprayed with 30 grams of Silquest® A-137 octyltriethoxysilane with agitation. The silane was in a 20% solution of 99.5% isopropanol and 0.5% distilled water with and adjusted pH of 4.5–5.0 using acetic acid. The silane-treated clay was dried in an oven at 60° C. for 8 hours. The dried clay (1,050 g) was compounded with 2450 g of Petrothene® NA 206 (MFI 13) LDPE from Equistar using a twin screw extruder model ZSK 30 from Werner & Pfleiderer in Ramsey, N.J. The weight ratio of treated clay to LDPE resin was 30:70. The compounded pellets were made into film samples to check the dispersion and samples were also prepared for tensile testing.

Example 11

The same procedure was followed as in Example 10 adding 1 wt-% Silwet® L-45 polydimethylsiloxane (PDMS) fluid to the silane copolymer-treated clay based on the weight of the treated clay. The PDMS was applied to the silane copolymer-treated clay with a Henschel mixer. The treated clay was dried and compounded with LDPE using the procedure as described in example 10.

Example 12

The same procedure was followed as in example 10 using octylsilane/tetraethyl silicate (TES) copolymer to treat the calcined clay.

Example 13

The same procedure was followed as in example 11 using octylsilane/tetraethyl silicate copolymer to surface treat the calcined clay.

Comparative C (Control)

The same procedure was followed as in Example 10 using untreated calcined clay.

The recorded processing parameters and testing results for examples 10–13 and for comparative example C are summarized in tables 3 and 4 below.

TABLE 3

| Example | Torque (ft-lb) | Output Rate (lbs/hour) | Pressure (psi) | Observations |
|---|---|---|---|---|
| Comparative C | 1850 | 36.8 | 25 | slight chalk off |
| 10 | 1800 | 41.3 | <25 | smooth |
| 11 | 1755 | 42.5 | <25 | smooth |
| 12 | 1800 | 44.2 | <25 | smooth |
| 13 | 1750 | 47.4 | <25 | smooth |

TABLE 4

| Example | Dispersion | Tensile Strength (psi) | Elongation (%) |
|---|---|---|---|
| Comparative C | good | 1760 | 61 |
| Example 10 | excellent | 1660 | 65 |
| Example 11 | excellent | 1550 | 69 |

TABLE 4-continued

| Example | Dispersion | Tensile Strength (psi) | Elongation (%) |
|---|---|---|---|
| Example 12 | excellent | 1660 | 64 |
| Example 13 | excellent | 1540 | 68 |

The above results illustrate that the silane copolymer or silane copolymer/siloxane treated calcined clay exhibited easier processing and higher output rate during extrusion compounding, and exhibited better dispersion and higher elongation when mixed with polyethylene as compared to using an untreated calcined clay.

Example 14

The same procedure was followed as in example 10 to surface treat Nanocor® PGW nanoclay. The weight ratio of nanoclay to LDPE was 5:95.

Example 15

The same procedure was followed as in example 11 above to surface treat the nanoclay with 1% Silquest® A-137 octyltriethoxy silane and Silwet® L-45 PDMS.

Example 16

The same procedure was used as in example 14 to surface treat the nanoclay with octylsilane/TES copolymer.

Example 17

The same procedure was used as in example 15 to surface treat the nanoclay with octylsilane/TES copolymer and PDMS.

The recorded processing parameters and testing results for examples 14–17 and for comparative example C are summarized in tables 5 and 6 below.

TABLE 5

| Example | Torque (ft-lb) | Output rate (lbs/hour) | Pressure (psi) | Observations |
|---|---|---|---|---|
| Comparative C | 2300 | 25.6 | <25 | smooth |
| 14 | 2150 | 25.4 | <25 | smooth |
| 15 | 2040 | 24.5 | <25 | smooth |
| 16 | 2150 | 26.4 | <25 | smooth |
| 17 | 2050 | 26.4 | <25 | smooth |

TABLE 6

| Example | Dispersion | Tensile Strength (psi) | Elongation (%) |
|---|---|---|---|
| Comparative C | fair | 1560 | 99 |
| 14 | good | 1550 | 104 |
| 15 | good | 1550 | 106 |
| 16 | good | 1540 | 105 |
| 17 | good | 1520 | 102 |

The above results illustrate that the silane copolymer or silane copolymer/siloxane treated nanoclay exhibited lower torque during extrusion compounding, and gave better dispersion and higher elongation when compounded with polyethylene as compared to an untreated nanoclay compounded with polyethylene. The use of copolymers to treat the nanoclay resulted in better compounding output without sacrificing the physical characteristics of the blend.

Examples 18–21 and Comparative Example D

Examples 14–17 and comparative example C were repeated substituting H-710 aluminum trihydroxide (ATH) available from Alcoa in Pittsburgh, Pa. for the nanoclay. The results are recorded in tables 7 and 8 below.

TABLE 7

| Example | Torque (ft-lb) | Output Rate (lbs/hour) | Pressure (psi) | Observation |
|---|---|---|---|---|
| Comparative D | 1750 | 39.9 | <25 | smooth |
| 18 | 1600 | 40.0 | <25 | smooth |
| 19 | 1450 | 40.4 | <25 | smooth |
| 20 | 1620 | 39.6 | <25 | smooth |
| 21 | 1460 | 44.3 | <25 | smooth |

TABLE 8

| Example | Dispersion | Tensile Strength (psi) | Elongation (%) |
|---|---|---|---|
| Comparative D | good | 1640 | 53 |
| 18 | excellent | 1500 | 59 |
| 19 | excellent | 1440 | 71 |
| 20 | excellent | 1460 | 70 |
| 21 | excellent | 1420 | 68 |

The above results illustrate that the silane copolymer or silane copolymer/siloxane treated ATH exhibited lower torque during extrusion compound, and exhibited better dispersion and higher elongation when compounded with polyethylene that the same blend using untreated ATH. Particularly, the octylsilane/TES copolymer with L-45 PDMS exhibited a higher output rate, excellent dispersion and higher elongation than comparative D using the untreated ATH.

Examples 22–25 and Comparative Example E

Examples 14–17 and comparative example C were repeated using magnesium hydroxide ($Mg(OH)_2$) as a substitute for the nanoclay. The processing parameters and test results for Examples 22–25 and for comparative E are summarized in tables 9 and 10 below.

TABLE 9

Processing Parameters Using A Twin Screw Extruder

| Example | Torque (ft-lbs) | Output Rate (lbs/hour) | Pressure (psi) | Observations |
|---|---|---|---|---|
| Comparative E | 1725 | 43.7 | 50 | smooth |
| 22 | 1600 | 43.2 | 25 | smooth |
| 23 | 1450 | 43.7 | 25 | smooth |
| 24 | 1580 | 44.1 | 25 | smooth |
| 25 | 1460 | 42.6 | <25 | smooth |

TABLE 10

Processing Parameters Using a Single Screw Extruder

| Example | Torque (ft-lbs) | Pressure (psi) | Observations |
|---|---|---|---|
| Comparative E | 2400 | 2960 | film had rough surface |
| 22 | 2300 | 2600 | smooth film |
| 23 | 2150 | 2680 | smooth film |

TABLE 10-continued

Processing Parameters Using a Single Screw Extruder

| Example | Torque (ft-lbs) | Pressure (psi) | Observations |
|---|---|---|---|
| 24 | 2300 | 2600 | smooth film |
| 25 | 2050 | 2670 | smooth film |

TABLE 11

| Example | Dispersion | Tensile Strength (psi) | Elongation (%) |
|---|---|---|---|
| Comparative E | good | 1590 | 17 |
| 22 | excellent | 1590 | 69 |
| 23 | excellent | 1510 | 66 |
| 24 | excellent | 1590 | 70 |
| 25 | excellent | 1460 | 62 |

The above results illustrate that the silane copolymer or silane copolymer/siloxane treated Mg(OH)$_2$ required lower torque and pressure during extrusion compounding and during film preparation, and gave better dispersion and higher elongation when mixed with polyethylene than did the comparative example E using the untreated Mg(OH)$_2$. The films also exhibited a much smoother surface with the treated Mg(OH)$_2$.

Example 26

An octylsilane/TES copolymer treated TiO$_2$ was added to a low density polyethylene polymer at a concentration of 20% by weight of the blend. The resultant mixture was extruded on a Brabender PL-V302 single screw extruder through a slot die at 620° F. (about 325° C. Evaluation of the film using a light box for dispersion quality revealed superior integrity with no thin spots or pin-holes. Lacing resistance was recorded and the material was rated 10 indicating no lacing occurred. Lacing resistance was comparable to the industry standard Ti-Pure® R-104, available from E.I. du Pont de Nemours and Company in Wilmington, Del.

Comparative Example E

Untreated TiO$_2$ pigment, RCL-4, available from Millennium in Baltimore, Md. was compounded with polyethylene at a concentration of 20% by weight of the total blend. The resultant material was extruded on a Brabender PL-V302 single screw extruder through a slot die at 620° F. The film exhibited thin spots and pin-holes under a light box. The film was rated as a 6 for lacing.

Lacing is described in the specification above. It occurs as a function of pigment volatility at specific wt-% pigment loadings and processing temperatures. For polyethylene films pigmented with titanium dioxide, a loading of 20% wt-% TiO$_2$ in the film processed at a temperature of 620° F. or greater will exhibit ready lacibility of the film. Typically, materials are rated 10 if they do not lace, and below 10 if they begin to lace.

What is claimed is:

1. A pigment or filler surface treated with an alkylsilane copolymer said copolymer having a plurality of hydrolyzable groups and comprising at least two different monomers, and said copolymer having the general structure:

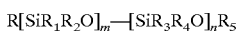

where
R and R$_1$, R$_4$ and R$_5$ are hydrolyzable groups;
R$_2$ is a nonhydrolyzable C$_1$ to C$_{20}$ aliphatic, cycloaliphatic or aromatic hydrocarbon group directly or indirectly bonded to the silicon atom;
R$_3$ is selected from hydrolyzable and nonhydrolyzable groups different from R$_2$; and
m and n are each independently 1 to 20.

2. The pigment or filler of claim 1 wherein said alkylsilane copolymer is further in combination with at least one nonhydrolyzable polysiloxane.

3. The pigment or filler of claim 2 wherein said nonhydrolyzable polysiloxane is a triorganosilyl terminated polydiorganosiloxane.

4. The pigment or filler of claim 1 wherein R, R$_1$, R$_4$ and R$_5$ are selected from alkoxy, halogen, acetoxy and hydroxy.

5. The pigment or filler of claim 1 wherein R$_2$ is alkyl and R$_3$ is a group different from R$_2$ which is selected from such as alkyl, which may be optionally substituted with epoxy, amino, mercapto or ureido or interrupted with one or more sulfur or oxygen atoms, alkenyl, (alk)acryloxyalkyl, alkoxy, halogen, acyloxy, hydroxy mercapto and amino groups.

6. The pigment or filler of claim 1 wherein said silane is an alkylsilane with 2 or 3 hydrolyzable groups condensed with at least one monomer selected from the group of:
  a) a silane having at least two hydrolyzable groups;
  b) a silicon compound with at least two hydrolyzable groups; and
  c) an organosilicon compound selected from the group of linear and cyclic organo compounds; and mixtures thereof.

7. A pigment or filler surface treated with an alkylsilane copolymer said copolymer having a plurality of hydrolyzable groups and comprising at least two different monomers, wherein said alkylsilane copolymer is selected from the group consisting of:
  a) a copolymer having the following general structure:

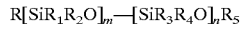

where
R, R$_1$, R$_4$ and R$_5$ are hydrolyzable groups;
R$_2$ is a nonhydrolyzable C$_1$–C$_{20}$, aliphatic, cycloaliphatic or aromatic hydrocarbon group directly or indirectly bonded to the silicon atom;
R$_3$ is selected from nonhydrolyzable and hydrolyzable groups different from R$_2$; and
m and n are each independently 1 to 20; and
  b) a terpolymer having the following general structure:

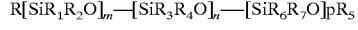

where
R, R$_1$, R$_4$, R$_5$ and R$_7$ are hydrolyzable groups;
R$_2$ is a nonhydrolyzable C$_1$–C$_{20}$, aliphatic, cycloaliphatic or aromatic alkyl group directly or indirectly bonded to the silicon atom;
R$_3$ and R$_6$ are selected from nonhydrolyzable and hydrolyzable groups different from R$_2$ and from each other; and
m, n and p are each independently 1 to 20.

8. The pigment or filler of claim 1 wherein at least one of said monomers is selected from methyltriethoxysilane, octyltriethoxysilane, octadecyltriethoxysilane, butyltriethoxysilane, dodecytriethoxysilane, methyltrimethoxysilane, octyltrimethoxysilane, octadecyltrimethoxysilane, butyltrimethoxysilane, dodecyltrimethoxysilane, and mixtures thereof.

9. The pigment or filler of claim 1 wherein said alkylsilane copolymer is present on the surface of said pigment or filler at a concentration of about 0.1 wt-% to about 5 wt-% of the treated pigment or filler.

10. The pigment or filler of claim 1 wherein said alkylsilane copolymer is present on the surface of said pigment or filler at a concentration of about 0.5 wt-% to about 3 wt-% of the treated pigment or filler.

11. The pigment or filler of claim 1 wherein said pigment or filler is a white pigment or filler.

12. The pigment or filler of claim 11 wherein said pigment or filler is titanium dioxide.

13. A polymeric composition comprising at least one organic polymer and a pigment or filler containing on the surface of said pigment or filler an alkylsilane copolymer, said copolymer comprising at least two different monomers, said alkylsilane being present on said surface of said pigment or filler resulting in a surface treated pigment or filler in an amount sufficient to improve the dispersibility of said pigment or filler in said polymeric composition, and said alkylsilane copolymer having the general structure:

$$R[SiR_1R_2O]_m\text{---}[SiR_3R_4O]_nR_5$$

where

R and $R_1$, $R_4$ and $R_5$ are hydrolyzable groups;

$R_2$ is a nonhydrolyzable $C_1$ to $C_{20}$ aliphatic, cycloaliphatic or aromatic hydrocarbon group directly or indirectly bonded to the silicon atom;

$R_3$ is selected from hydrolyzable and nonhydrolyzable groups different from $R_2$; and m and n are each independently 1 to 20.

14. The polymeric composition of claim 13 comprising at least one polymer selected from the group consisting of olefins and alphaolefins and their copolymers and terpolymers; rubbery block copolymers; polyamides; polyesters; vinylic polymers, acrylics; epoxies; and mixtures thereof.

15. The polymeric composition of claim 13 comprising at least one polymer selected from the group consisting of polyethylene, polypropylene, polyvinyl chloride, polyamides, polyesters, their copolymers and terpolymers thereof, and mixtures thereof.

16. The polymeric composition of claim 13 comprising a polyethylene homopolymer.

17. The polymeric composition of claim 13 wherein said pigment or filler is a white pigment or filler.

18. The polymeric composition of claim 13 wherein said pigment or filler is titanium dioxide.

19. The polymeric composition of claim 13 wherein said pigment or filler is present at a concentration of about 40 wt-% to about 90 wt-% based on the weight of the composition.

20. The polymeric composition of claim 13 wherein said pigment or filler is titanium dioxide.

21. A pigment or filler treated with a treatment agent, wherein the pigment or filler is selected from the group consisting of clays, nanoclays, aluminum trihydroxides, magnesium hydroxides, and mixtures thereof; and the treatment agent comprises at least one alkylsilane copolymer having the general structure:

$$R[SiR_1R_2O]_m\text{---}[SiR_3R_4O]_nR_5$$

where

R and $R_1$, $R_4$ and $R_5$ are hydrolyzable groups;

$R_2$ is a nonhydrolyzable $C_1$ to $C_{20}$ aliphatic, cycloaliphatic or aromatic hydrocarbon group directly or indirectly bonded to the silicon atom;

$R_3$ is selected from hydrolyzable and nonhydrolyzable groups different from $R_2$; and m and n are each independently 1 to 20.

22. The pigment or filler of claim 21 wherein said treatment agent is an alkyltrialkoxysilane selected from the group consisting of alkyltrimethoxysilanes, alkyltriethoxysilanes, and mixtures thereof.

23. The pigment or filler of claim 22 wherein the alkyl group of said alkyltrialkoxysilane has at least 3 carbon atoms.

24. The pigment or filler of claim 21 wherein said treatment agent has been applied on the surface of said pigment or filler at a concentration of about 0.1 wt-% to about 5.0 wt-% of said treated pigment or filler.

25. The pigment or filler of claim 21 wherein said treatment agent further comprises a non-hydrolyzable polysiloxane.

* * * * *